Oct. 26, 1943.  E. A. DROTT  2,332,561
MATERIAL HANDLING APPARATUS
Filed May 22, 1941  5 Sheets-Sheet 1

INVENTOR
Edward A. Drott
BY Louis O. French
ATTORNEY

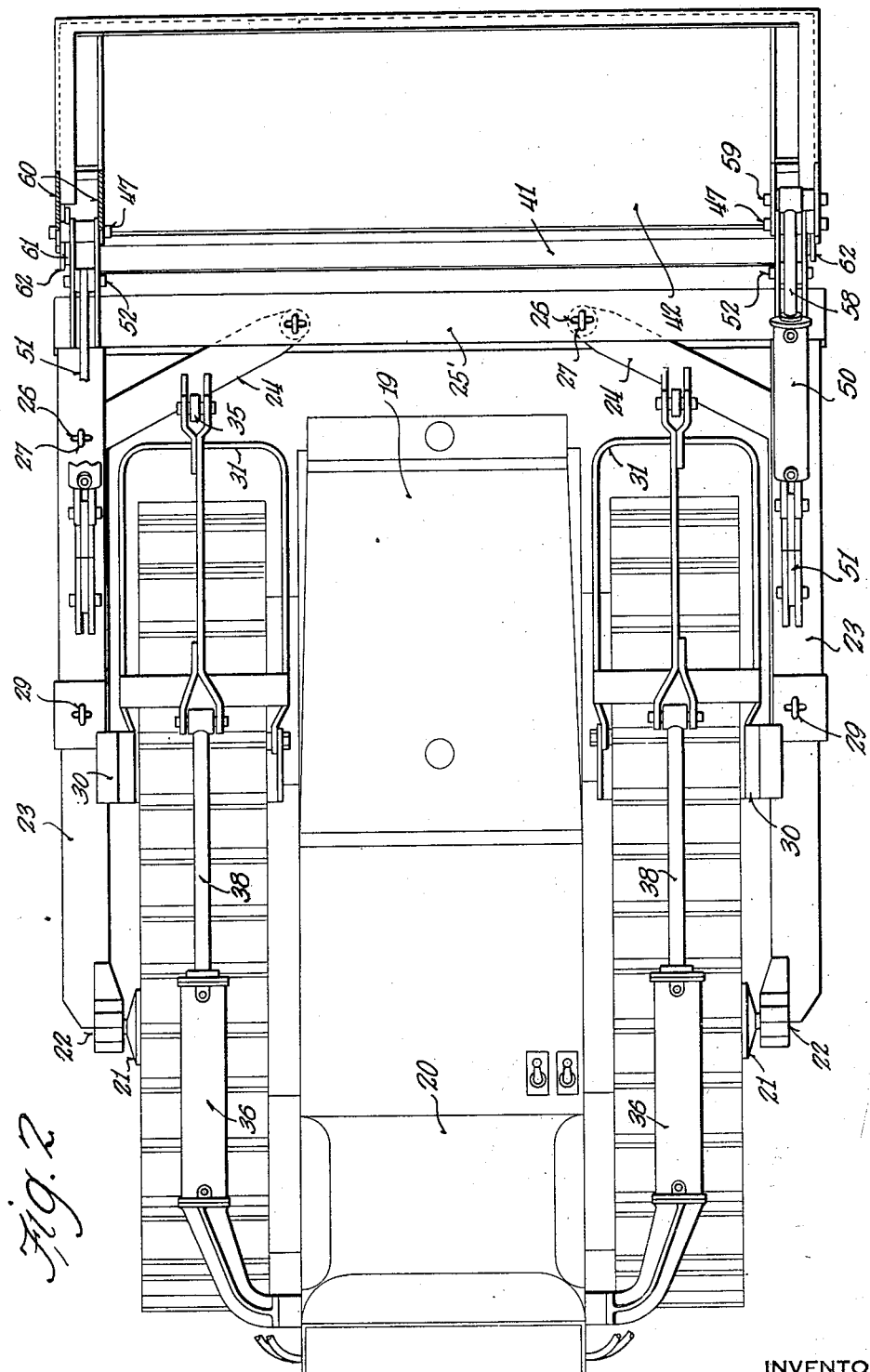

Oct. 26, 1943.    E. A. DROTT    2,332,561
MATERIAL HANDLING APPARATUS
Filed May 22, 1941    5 Sheets-Sheet 3
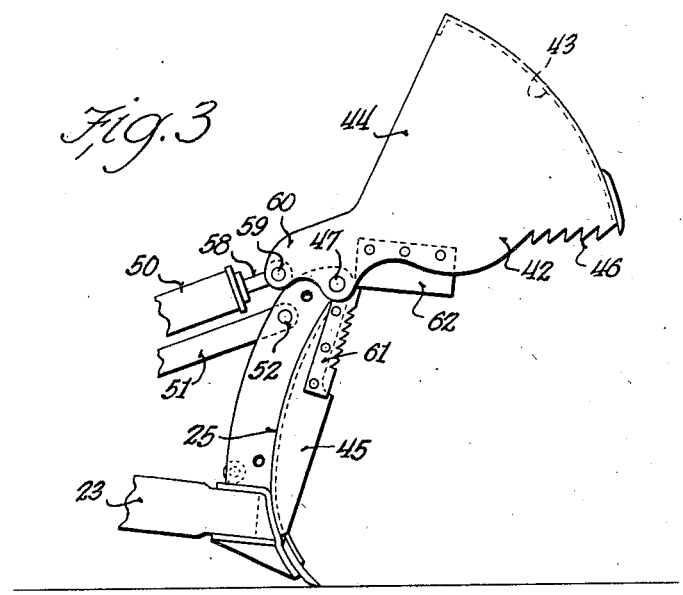
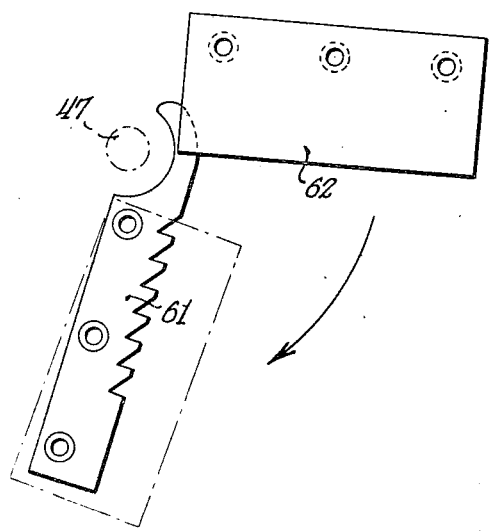
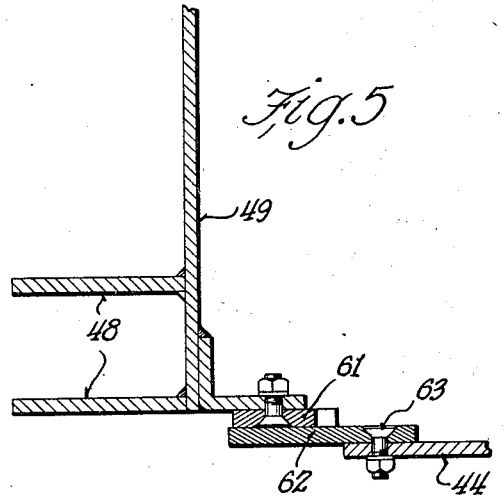
INVENTOR
Edward A. Drott
BY Louis O. French
ATTORNEY Oct. 26, 1943.     E. A. DROTT     2,332,561
MATERIAL HANDLING APPARATUS
Filed May 22, 1941     5 Sheets-Sheet 4

INVENTOR
Edward A. Drott
BY Louis O. French
ATTORNEY

Oct. 26, 1943.  E. A. DROTT  2,332,561
MATERIAL HANDLING APPARATUS
Filed May 22, 1941  5 Sheets-Sheet 5
FIG. 10.
FIG. 9.
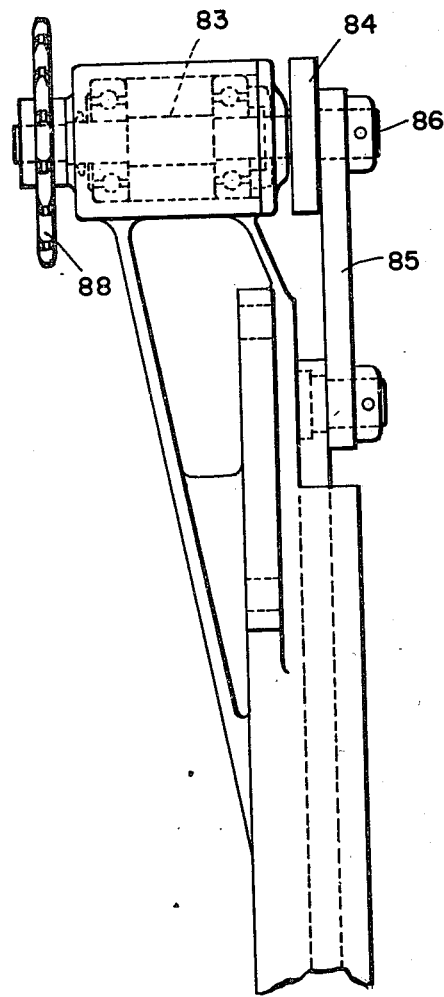
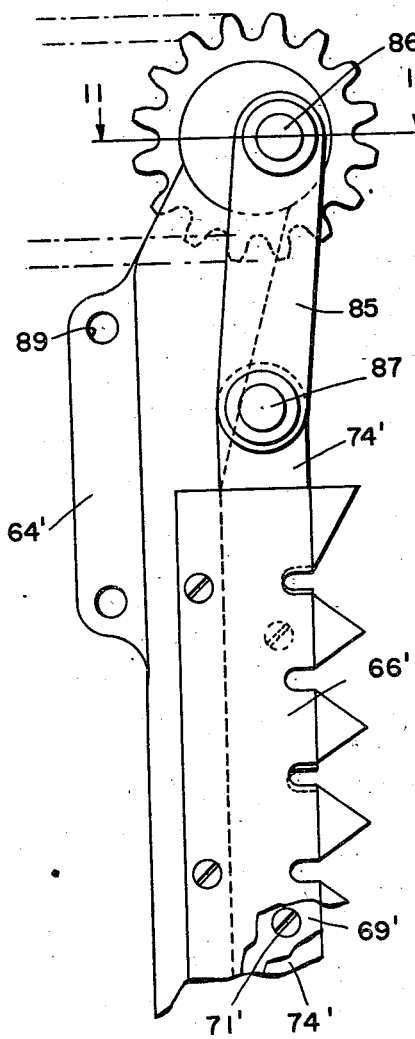
FIG. 11.
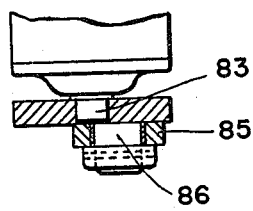
INVENTOR
Edward A. Drott
BY Louis O. French
ATTORNEY Patented Oct. 26, 1943

2,332,561

UNITED STATES PATENT OFFICE 2,332,561

MATERIAL HANDLING APPARATUS

Edward A. Drott, Milwaukee, Wis., assignor to Hi-Way Service Corporation, Milwaukee, Wis., a corporation of Wisconsin Application May 22, 1941, Serial No. 394,675

5 Claims. (Cl. 37—118)

The invention relates to an apparatus for removing barb wire entanglements and other obstructions that may oppose an army's advance. More particularly, according to the present invention, I provide a motor-driven tractor with a power operated wire-cutting mechanism which may be mounted at different places on the vehicle though preferably at the front of the same, so that as the vehicle is advanced the cutter will in addition to its own movement be also moved relative to the material being cut. Also in its preferred form the wire cutting mechanism is incorporated as a part of the bulldozer and scoop member of the prior application of Edward A. Drott and Joseph H. Kerber, for "Material handling apparatus," Serial No. 372,322, filed December 30, 1940, which embodies a bulldozer preferably mounted on a traction vehicle and a scoop member mounted at the front of the bulldozer and cooperating therewith to either carry bulk material or heavy objects, such as posts, logs, etc. By the present invention the wire forming the entanglements may be cut through by the wire cutting apparatus hereinafter described, and the posts that may be used to carry the wire may be removed by the same machine.

A further object of the invention is to provide a motor driven vehicle with a wire and cable cutting mechanism mounted at the front thereof and operable by the operator of the vehicle.

The invention further consists in the several features hereinafter set forth and more particularly defined by claims at the conclusion hereof.

In the drawings:

Fig. 2 is a plan view thereof;

Fig. 3 is a detailed view of parts of the apparatus embodying the invention;

Fig. 4 is a detailed enlarged view of the cutting jaws;

Fig. 5 is a detailed sectional view taken on the line 5—5 of Fig. 1;

Fig. 9 is a side elevation view of certain other modifications in the wire cutting mechanism, parts being broken away;

Fig. 10 is a back view of parts shown in Fig. 9;

Fig. 11 is a detailed sectional view taken on the line 11—11 of Fig. 9.

Figure 1:
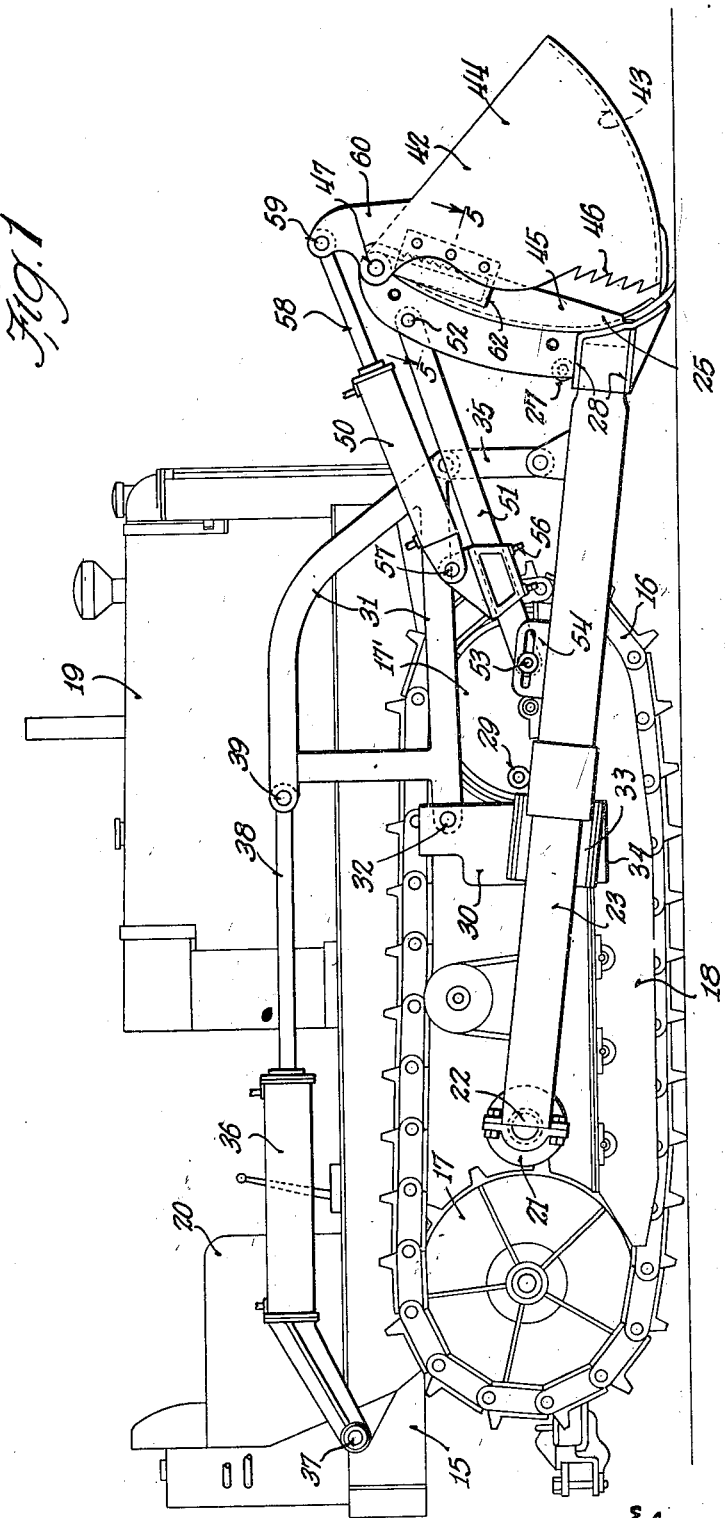
Fig. 1 is a side elevation view of an apparatus embodying the invention.

In the drawings, the numeral 15 designates generally a tractor of known construction of the full crawler type having endless propelling treads 16 running over sprockets 17 and 17', here shown conventionally at the rear and front portions of the tractor and over the usual truck or tread rollers (not shown) mounted in the truck or tread frames 18. As is usual, the rear sprockets 17 are driven from the engine housed in the housing 19 through a suitable transmission (not shown) and under the control of the operator or driver of the tractor from his seat 20, these controls not being specifically shown. The tread frames 18 include frame members to which pivot-forming brackets 21 are secured, said brackets having ball shaped pivot ends 22 upon which the side frame members 23 of the plow supporting frame are pivotally mounted. This supporting frame further includes angular frame members 24 which may be adjustable lengthwise relative to the members 23, said members 23 and 24 adapted to be connected at their outer ends to a pusher blade or other implement member 25 by pin joints consisting of elongated or oval slots 26 in the frame members adapted to receive a coupling pin 27 which pin also passes through spaced parts of a transversely extending frame part 25'. The slots 26 allow the pins 27 sufficient play so as to permit the raising or lowering of one end of the implement member 25 relative to the other. The frame members 23 and 24 are detachably secured to each other through removable pin connections 29. The slots for these pins may also be loose in a transverse direction to accommodate the individual tilting of the frame members. Angular brackets 30 generally similar to those shown and described in the prior issued Patent No. 2,190,452, dated February 13, 1940, are rigidly secured to the truck frame, and U-shaped lever members 31 straddle the front ends of the truck frames 18 and are pivotally connected to each set of brackets by pivot bolts 32. The side frame members 23 preferably carry plates 33 which cooperate with similar plates 34 on the brackets 30 to keep the sides of the supporting frame in proper alignment. Each member 31 is operatively connected by a link 35 with a part of the side frame, particularly the front end of the part 24. Each of the supporting frames are independently operable through a hydraulically operated means including a hydraulically operated cylinder 36 pivotally connected at its rear end upon a pivot 37 secured to the frame of the tractor and having a piston working in said cylinder with its rod 38 operatively connected to the lever 31 by a pivot pin 39. It will be noted that the lever 31 is composed of several pieces welded or otherwise suitably secured together to form a triangular frame fulcrumed at 32 and operatively connected at its ends to the rod and at its rear end to the power means here shown as the hydraulically operated cylinder 36. Each of the cylinders 36 is adapted to be supplied through pipe connections (not shown) with fluid from a suitably controlled source of pressure supply.

With the above construction, movement of the rod 38 toward the left swings the lever 31 upwardly, and this through the link 35 acts to swing the arm formed by one set of frame members 23, 24 upwardly and thus lift that end of the pusher blade to which said frame members are connected. The arm for the other end of the pusher blade is similarly moved by a similar hydraulically operated rod 38 on the other side of the vehicle. Thus since each of the ends of the pusher blade or implement member 25 are independently adjustable, the vertical angularity of this member may be adjusted to suit the requirements of the work. It is to be noted that the cylinder 36 is a double acting cylinder, so that introduction of hydraulic fluid under pressure to the rear end of the cylinder acts to push the rod 38 forwardly and acts through the lever 31 and link 35 to put a positive downward pressure on the arm 23 and consequently the blade 25.

Upon the plow or bulldozer structure thus far described I mount a gripper member 42 which in the embodiment shown is in the form of an open ended scoop member having a curved bottom 43 coextensive in length with the length of the blade 25 and side plate portions 44 forming jaws adapted to cooperate with jaws secured to the plow structure and formed by side plates 45 which are suitably secured to the bulldozer 25. The jaw forming plates 44 are also preferably provided with gripping teeth 46 to enable them to get a good grip on logs, timbers, and the like. The scoop and gripper member is pivotally connected at each of the upper ends of the side plate portions 44 by a pin 47 carried in frame parts 48 secured to or formed integral with the moldboard 49.

Power operated means are provided for moving the gripper or scoop member into its various operating positions. The means for swinging the gripper and scoop member 42 to its various operating positions comprises a double acting hydraulic actuator at each side thereof and including a cylinder 50 which in this instance is adjustably mounted on a bracket means in the form of a link 51 pivotally connected at its upper end by a pin 52 to the moldboard 48 and its lower end by a pin 53 which for one side is mounted for a certain amount of movement in a longitudinally slotted bracket 54 secured to or forming part of the side arm 23. A bracket 55 is slidably mounted on the link 51 and secured in any desired adjusted position thereon by set screws 56 and carries the supporting pivot pin 57 for the rear end of the cylinder 50. The rod 58 for the actuating piston that works in the cylinder 50 is pivotally connected at its outer end by a pin 59 to an extension 60 of the side portion 44 of the scoop or gripper member 42.

With this last described construction, the reciprocation of the rod 58 under the action of hydraulic fluid will act directly on the member 42 to swing it to any desired angular position and through the control of the pressure fluid on both sides of the hydraulically operated piston, the rod 58 and member 42 may be held in any desired fixed position. This form of gripper and scoop moving means allows the hydraulic fluid to act on the front face of the actuating piston while moving the rod 58 to a position in which the scoop member 42 is closed, thereby securing the full force of the hydraulic fluid so as to get a powerful gripping action between the jaws of the gripper member. It permits the stroke of the rod 58, through the adjustment of the bracket 55 along the link 51, to be varied to suit different working requirements. The slotted bracket 54 compensates or provides for relative movement between the support 51 for the cylinder 50 and the tiltable frame or arm 23 with which it is connected so as to allow independent tilting movement of each arm 23, so that the scoop member 42 may be tilted vertically.

For cutting metal cables, barbed wire or other wire entanglements the ends of the bulldozer part 25 are provided with cutting blades 61, one at each end, here shown as toothed, and the scoop member 42 is provided with cooperative cutting blades 62, one at each end, as shown more particularly in Figs. 3, 4, and 5 of the drawings, so that the blades 62 will produce a sheering cut relative to the blades 61 as the scoop member 44 is moved from open to closed position. The toothed formation of each cutting blade 61 is important as it permits the cutting of a cable or a bunch of barbed wires as the notches hold the cable or wires, so that it may be cut through in one or more strokes of the scoop member depending upon the dimensions of the obstructions to be cut through. With this notched blade parts of the obstruction may lodge itself in one notch and parts in another as the cutting proceeds. As shown in Fig. 5, the blades 61 and 62 are removably secured to their respective carriers by bolts 63.

With this apparatus, where cables, wire entanglements or wire and post entanglements block an army's advance, this machine may go forward, and with the scoop member 42 in raised or open position and both the bulldozer and scoop raised, through the action of the hydraulic hoist including the cylinders 36 and levers 31, to the desired height relative to the ground to bring the jaws 61 and 62 into line with the cable, wire or wires to be cut, the hydraulic fluid is introduced into the cylinder 50 so as to move the member 42 to a closed position and thus bring the parts 61 and 62 into shearing or cutting relation with each other to cut through the wire obstruction. It is also to be noted that the obstructing wires may be pushed off the ground or worked up to the region of the blade 61 by the action of the bulldozer as it is pushed forwardly. It is also to be noted that even if the wires are partly embedded in earth or other loose material, such material will not interfere with the cutting of the wires as the scoop member 42 in moving to closed position will slice or cut through the earth which it may come in contact with. It is also to be noted that fence posts or other supports to which the wire may be anchored may be uprooted by the bulldozer 25 and carried off between the jaws 45 and 46 by manipulation of the hydraulically operated piston members 58 and the hoist mechanism for the parts 25 and 42.

The apparatus also is capable of all the other uses previously referred to in the co-pending application Serial No. 372,322.

Figure 6:
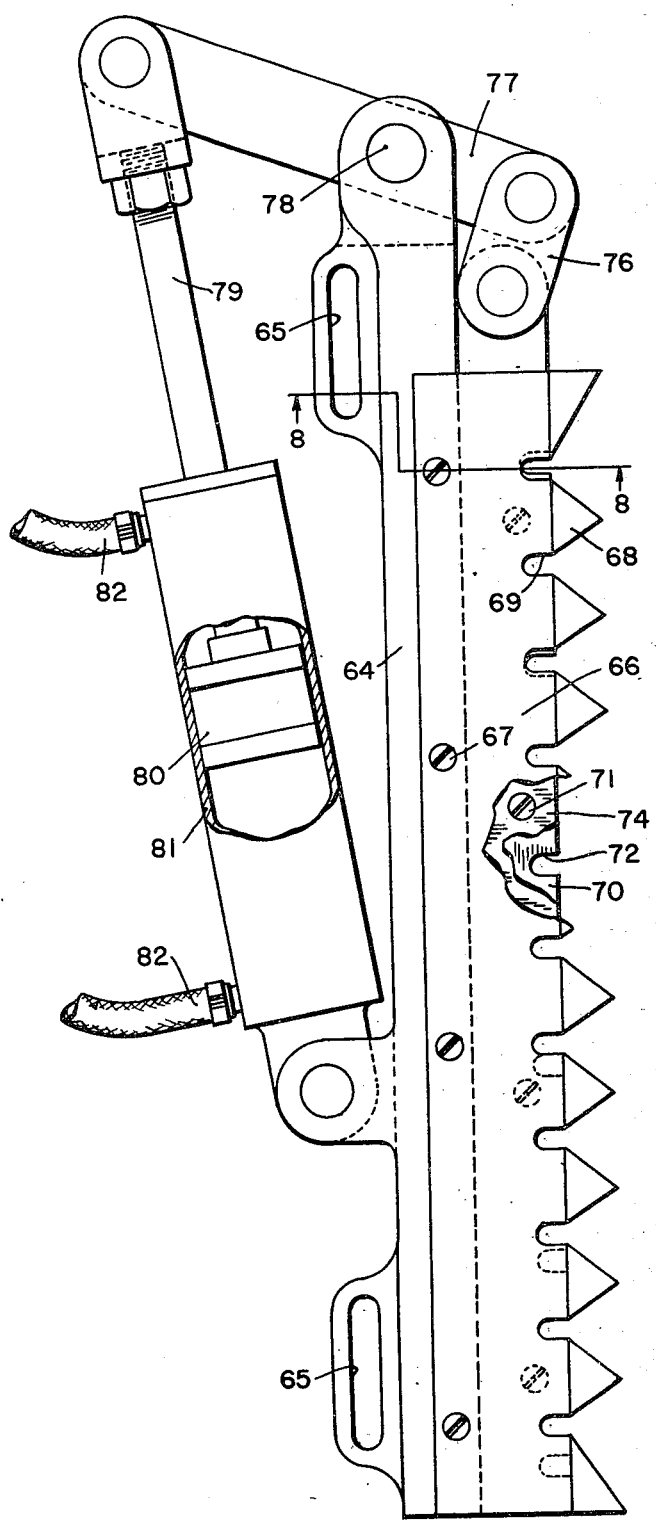
Fig. 6 is a side elevation view of certain modifications in the wire cutting mechanism, parts being broken away.
Figure 8:
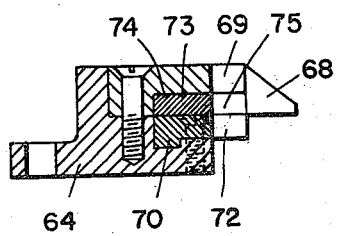
Fig. 8 is a detailed sectional view taken on the line 8—8 of Fig. 6.
Figure 7:
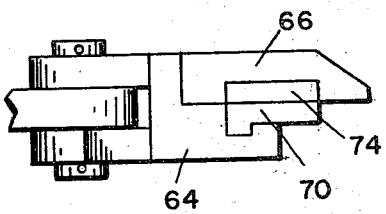
Fig. 7 is a detailed end view of the cutting mechanism shown in Fig. 6.

As a modification I may provide a wire cutting mechanism of the type shown in Figs. 6 to 8 and mount this at the front or side of a motor driven tractor, but preferably at the side of a tractor of the form herein shown, either along the side part of the bulldozer or the side part of the scoop member and arrange to operate this by a hydraulic motor controlled by the operator at his seat in the vehicle. As shown in the drawings, this structure includes a frame member 64 slotted at its opposite ends at 65 to take bolts for fastening it to the desired part of the machine. This frame member has a fixed cutter bar 66 secured thereto by screws 67, the cutter bar being formed with teeth 68 and notches 69, at the bases of said teeth. Another fixed bar 70 is secured to the frame member 64 by screws 71 and has notches 72 which aline with the notches 69 of the fixed cutter bar. A movable cutter bar 73 is slidably mounted in a recess 74 of the fixed cutter bar 66 and slides at one side along the bar 72, this movable bar 74 having notches 75 formed therein that may aline with the notches 69 and 72 or move across the same to accomplish the sheering cut of the material that may find its way into the notches. The teeth 68 tend to deflect the material into the notches for cutting and also limit the amount of material that may be presented to the cutter. The movable bar 74 is reciprocated to make the cut by connection through a link 76 and lever 77, pivoted at 78 on the frame bar 64, with the rod 79 of an hydraulically operated piston 80 which works in a hydraulic cylinder 81 adapted to be supplied with fluid at either end through piping 82. Thus by suitable valve control mechanism of known form the piston 80 may be moved back and forth in the cylinder 81 so as to reciprocate the cutter bar 74 to accomplish the cutting of the wire as the vehicle proceeds. Also where such cutting mechanism is mounted on the scoop or the bulldozer of the apparatus shown in the first form, the cutter bar may be raised and lowered relative to the ground through the raising and lowering of either the bulldozer or the scoop member.

Another modification of a cutting mechanism that may be used with the motor driven tractor and particularly one of the type shown and described herein is shown in Figs. 9 to 11 in which the cutter mechanism is the same as that of the form just described using a frame bar 64' having a fixed cutter bar 66' secured thereto and an auxiliary cutter bar 69' secured thereto by screws 71' and a movable cutter bar 74' operatively connected to a power driven shaft 83 by a crank disk 84 and a connecting rod 85 operatively connecting the crank pin 86 with a pivot pin 87 carried by the cutter bar 74'. The shaft 86 may be the pivot shaft such as the shaft 47 of the first form, but is herein shown as a separate shaft adapted to be driven through a sprocket 88 that may be connected by a chain to any suitable form of motor drive under the control of the operator at his driving seat 20 in the motor driven vehicle. The frame member 64' of this form is shown as provided with bolt holes 89 for attachment to the desired part of the vehicle but preferably to either the side edge of the bulldozer 25 or the side of the scoop 42. The general method of operation of this cutting mechanism is the same as the hydraulically operated mechanism above described and shown in detail in the sectional views of Figs. 7 and 8.

I desire it to be understood that this invention is not to be limited to any particular form or arrangement of parts except in so far as such limitations are included in the claims.

What I claim as my invention is:

1. In a material handling apparatus, the combination with a motor driven vehicle, of a bulldozer structure vertically adjustably mounted on said vehicle and having a vertically disposed wire cutting blade, and a movable vertically disposed wire cutter member mounted on said structure and adapted to cooperate with said blade.

2. In a material handling apparatus, the combination with a vehicle, of a pair of vertically swinging supports and a pusher member carried on the outer ends thereof and provided at its ends with wire cutting blades, and a movable gripper member mounted on said pusher member and provided with cutting blades adapted to cooperate with the blades on said pusher member.

3. In a material handling apparatus, the combination with a motor driven vehicle, of a pair of vertically swinging supports and a pusher member carried on the outer ends thereof and provided at its ends with wire cutting blades, and a member movably mounted on said first named member and provided with cutting blades adapted to cooperate with the blades on said pusher member.

4. In a material handling apparatus, the combination with a motor driven vehicle having a driver's seat, of a pair of vertically swinging supports and a pusher member carried on the outer ends thereof and provided at its ends with wire cutting blades, a gripper member pivotally mounted on said pusher member and provided with cutting blades adapted to cooperate with the blades on said pusher member, and means controlled from the driver's seat for moving said gripper member 5. In an apparatus of the character described, the combination with a motor driven vehicle, of a pair of swinging arms adapted for connection to a vehicle, a member connecting said arms together and provided at its ends with wire cutting blades, means for independently raising and lowering said arms to adjust the angle of said blades in a vertical plane, and a member pivotally mounted on said first named member and provided with cutting blades adapted to cooperate with said first named blades on the swinging movement of said last named member.

EDWARD A. DROTT.